United States Patent [19]
Klein et al.

[11] 3,903,589
[45] Sept. 9, 1975

[54] METHOD FOR FABRICATION OF ANODES

[75] Inventors: Gerhart P. Klein, Manchester; William F. Vierou, West Acton, both of Mass.

[73] Assignee: P. R. Mallory & Co., Inc., Indianapolis, Ind.

[22] Filed: Feb. 13, 1974

[21] Appl. No.: 442,174

Related U.S. Application Data

[62] Division of Ser. No. 222,015, Jan. 31, 1972, Pat. No. 3,817,782.

[52] U.S. Cl. ........................... 29/570; 29/628
[51] Int. Cl. ............................. B01j 17/00
[58] Field of Search ............. 29/570, 590, 628

[56] References Cited
UNITED STATES PATENTS

| | | | |
|---|---|---|---|
| 2,457,515 | 12/1948 | Acker | 427/118 |
| 2,822,302 | 2/1958 | McCaughna | 117/221 |
| 2,856,681 | 10/1958 | Lacy | 228/175 |
| 3,041,209 | 6/1962 | Beggs | 427/77 |
| 3,290,761 | 12/1966 | Ho | 29/570 |
| 3,403,303 | 9/1968 | Klein | 29/570 |
| 3,485,654 | 12/1969 | McGraw | 428/32 |
| 3,573,996 | 4/1971 | Paine | 148/6 |
| 3,618,200 | 11/1971 | Matsuo | 29/570 |
| 3,732,470 | 5/1973 | Robinson | 29/570 |
| 3,733,660 | 5/1973 | Kallianides | 29/25.41 |

*Primary Examiner*—Roy Lake
*Assistant Examiner*—W. C. Tupman
*Attorney, Agent, or Firm*—Charles W. Hoffmann; Robert F. Meyer; Donald W. Hanson

[57] ABSTRACT

A new technique of contacting the ends of film forming metal wire in a slurry of film forming metal powder in a liquid, drying the coating, and sintering the adhering powder to the wire results in anodes suitable for fabrication into capacitors.

1 Claim, 7 Drawing Figures

METHOD FOR FABRICATION OF ANODES

This application is a division of Ser. No. 222,015, filed Jan. 31, 1972, now U.S. Pat. No. 3,817,782.

BACKGROUND OF THE INVENTION

The fabrication of small anodes by pressing of powder with the leads either welded on after presintering or pressed into the anode presents serious problems of controlling the size of anodes and of handling. To produce anodes within tight limits of CV-product small amounts of powder have to be measured accurately and consistently and the density of pressing must be controlled within tight limits. The small amounts of compacted powder have then to be attached to the ends of wire, or to foil for processing and to provide a means of making electrical contact to the finished device.

Volumetric measuring of the small amounts of powder is inherently inaccurate, especially at the smallest end where minute quantities of the order of milligrams are required.

SUMMARY OF THE INVENTION

An object of this invention is to provide a method of producing small anodes for capacitors of the wet or dry type.

Another object of the invention is to produce anodes in the range from 1 to 50 ufd-volt.

A new technique of dipping the ends of film forming metal wire in a slurry of film forming metal powder in viscous liquids, drying the coating, and sintering the adhering powder to the wire results in small anodes suitable for capacitors.

The use of viscous liquids produces a suspension of the powder with a slow rate of settling in spite of the high specific gravity of film forming metals such as niobium and tantalum. Also, the finer the powder the slower the rate of settling. The slurry can be circulated by means of a kinetic tubing pump which produces sufficient movement of the slurry to keep the powder in suspension indefinitely. This property of a viscous slurry makes it possible to prepare slurries with different concentrations of powder in them. By dipping the ends of wire in slurries with different powder concentrations one can control the amount of powder deposited since the size of the droplet adhering to the wire after withdrawal from the slurry is of about equal size independent of the amount of powder in it. After drying, different amounts of powder remain on the wire. This permits the preparation of anodes with very small amounts of powder on them with similar ease as those with larger amounts.

The wire leads are fixtured by welding to ribbon or wire of the same metal as the powder. The ends are formed into nail heads or are flattened, depending on the size and shape of the anode desired. After dipping, the fixture is transported to a drying station, followed by sintering in a high temperature furnace with open ends which is flushed with argon.

Small anodes can thus be manufactured in a continuous process without handling and without the need to work with extermely small parts as would be the case if they were pressed and had to be welded to risers.

DETAILED DESCRIPTION

Figure 1:
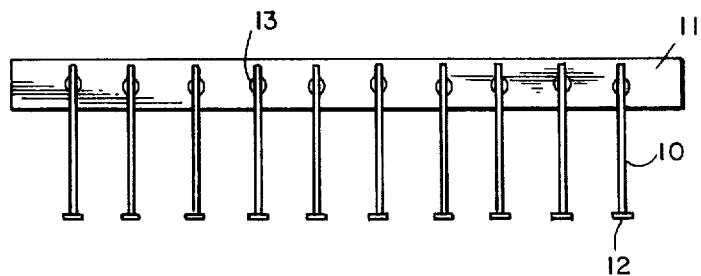
FIG. 1 is a view of headed risers attached to a carrying means.
Figures 2A, 2B:
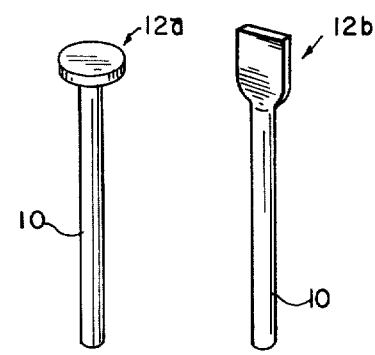
FIG. 2a, 2b, 2c and 2d show the heads on two exemplary risers before and after dipping in the slurry.
Figure 2C:
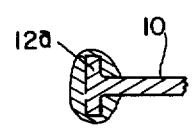
Figure 2D:
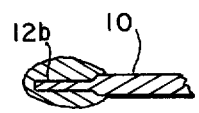

Film forming metal lead wires or risers 10 are attached to stringers 11 at right angles as shown in FIG. 1. The risers are made from wire which has an absorbing member 12 such as a nail head 12 a in FIG. 2, or a flattened portion 12 b at its free end. The risers are welded at a point 13 to the stringer-ribbon with predetermined spacing between adjacent risers. While the ribbon size may vary widely; however typical dimensions of the ribbon are: 0.01 inch thick, 0.125 inch wide, 2.0 inches long. The wire size is dependent upon the desired CV, i.e. thinner wire is used for smaller anode sizes. However typical risers have the following dimensions: Wire diameter 0.020 inch, length 0.3 inch –0.75 inch, with a head diameter of 0.03 inch to 0.05 inch. In the case of flattened ends the flat portion of the lead measures, typically, 0.05 inch wide by 0.07 inch long. The spacing between risers is at least 0.167 inch, center to center.

To facilitate wetting of the ends of the risers with slurry it is preferred to surface condition the ends; i.e. to clean them and/ or either sandblast the ends or electrochemically etch them. For example, good results were obtained by using a solution of 3% ammonium bromide in water free methanol and etching at a current of 10 ma per riser for 2 to 5 minutes.

A variety of liquids may be utilized to form the viscous slurry. Any liquid having the proper viscosity and which is inert with respect to the anode material, and which vaporizes above 40°C but at a temperature low enough to avoid damaging the anode metal may be used. 400°C is about the highest vaporization temperature which could be used for tantalum and niobium and the temperature is preferably below 300°C. Preferably the viscosity of the liquid should be within the range of 500 to 6000 centipoise depending upon the particular film forming metal anode being prepared, preferably 800 to 1200 centipoise. Examples of such liquids include saturated hydrocarbons including straight or branched chain saturated hydrocarbons having 5 to about 20 carbon atoms, cyclic aliphatic hydrocarbons having 5 to about 12 carbon atoms; saturated alcohols having to 2 to about 12 carbon atoms (including cyclic alcohols); and saturated glycols including cyclic glycols having 2 to about 12 carbon atoms; and water. Mixtures of the foregoing liquids may be used to obtain the desired viscosity and boiling point. Preferred materials as the viscous liquid for the production of tantalum or niobium anodes are ethylene glycol, propylene glycol, glycerol (glycerine) and cyclohexanol.

To prepare the slurry, measured amounts of the liquid and powder are mixed in the suitable container. Any concentration of powder in liquid up to the maximum concentration can be prepared. The actual concentration required for a specified CV rating will have to be determined empirically considering such factors as the riser geometry, method of dipping, and sintering conditions.

Depending on the average particle size and the type of powder different maximum concentrations of powder in liquid exist above which the slurry no longer flows. This is the limit of usefulness since it is necessary to keep the slurry in motion by pumping in order to prevent the eventual settling of the powder. For example, concentration limits for tantalum with average particle diameters ranging from 4 to 10 micron in glycerine at 25°C have been found to be from 4 to 10 grams per milliliters depending upon powder type. Similar concentration limits exist for other liquids and other film forming metals.

The rate of settling of niobium and tantalum powder in liquids with lower viscosity is much higher and it is not always possible to maintain the powder in suspension. Preferably the powder will settle to a firm mass with little excess liquid on top so that dipping risers with nail heads will result in the slurry sticking. If there is a layer of liquid on top of the firmly packed mass of powder, often powder which may have adhered to the riser after withdrawal from the packed powder is washed off by the liquid. Thus proper control of the viscosity of the slurry is important.

Figure 3:
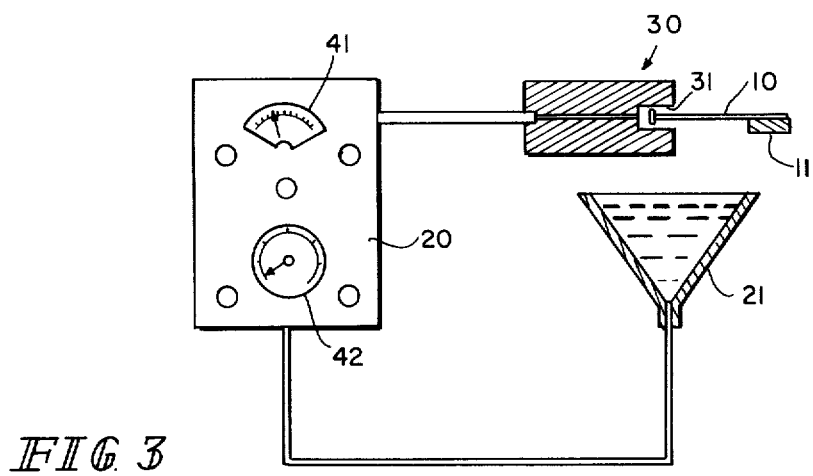
FIG. 3 is a view of one set-up which may be used for dipping.

To maintain uniform slurry consistency it must be circulated continuously. This may be done for example by using kinetic clamp tubing pumps which permit the slurry to be contained in elastomeric tubing. For example, as shown in FIG. 3, a SIGMAMOTOR kinetic clamp pump 20 with adjustable pump speed was used. The slurry is circulated continuously from a reservoir 21 into a horizontal slot applicator 30 having a slot 31 (such as described in application Ser. No. 93,869 filed Nov. 30, 1970, now U.S. Pat. No. 3,669,062 and application Ser. No. 93,486 filed Nov. 27, 1970, now U.S. Pat. No. 3,733,660, which are hereby incorporated into the present application by reference). Any overflow of the liquid is returned to the reservoir.

Figure 4:
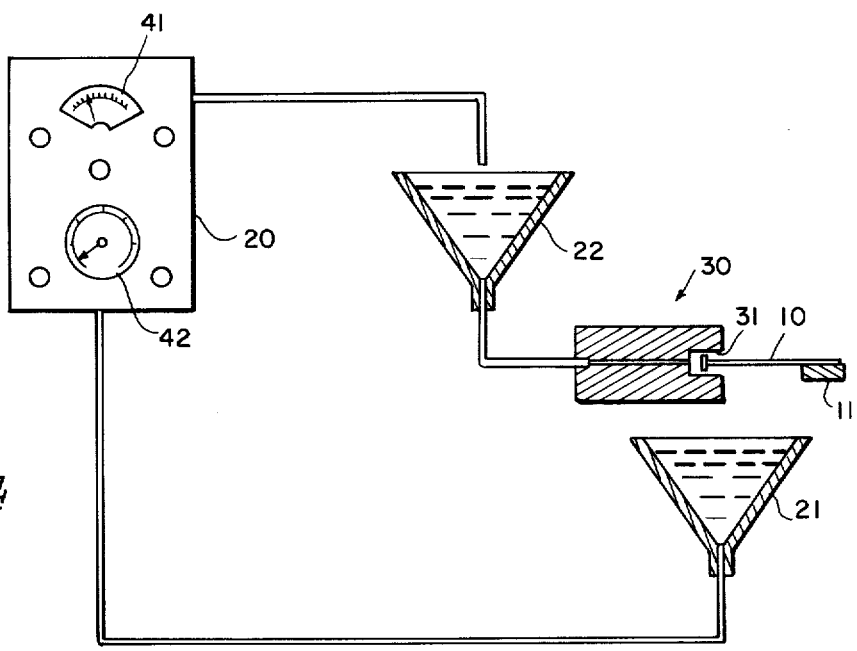
FIG. 4 is a view of another set-up which may be used for dipping.

In order to eliminate any pulsations which may result from the use of this type of pump a modified set-up may be used as shown in FIG. 4, in which the slurry flows into the slot applicator under the influence of gravity from a second reservoir 22. The kinetic clamp pump 20 is used to recirculate the slurry.

For dipping, the risers are passed through the slot applicator with a depth of immersion from 0.01 to 0.4 inches, preferably 0.02 to 0.1 inches. As the riser leaves the slurry a droplet of slurry is left on it. Obviously, it is important that the amount of slurry deposited be controlled within narrow limits. The amount of slurry left on the riser is controlled by the viscosity and powder concentration in the liquid, the size and shape of the risers end, and the rate of withdrawal from the slurry.

During dipping the slurry should preferably have a temperature of 15° to 40°C, preferably 20°–25°C.

In order to keep the viscosity constant, the temperature of the slurry must be carefully controlled. This may sometimes require control to within 5°, preferably, within 1°C. Proper circulation is required to maintain uniform slurry consistency. Appropriate temperature control means 41 and circulation control means 42 are illustrated schematically in FIGS. 3 and 4.

The size and shape of the riser is determined by the limitations of the package into which the anode is to fit. This leaves two variables: Powder concentration and withdrawal rate. Both are used to control the amount deposited to obtain CV range desired for a given application.

For constant withdrawal rate the amount of powder deposited is a function of powder concentration. For concentrations of powder in the slurry from 0.5 to 8 g/ml, about 0.15 to 15.0 milligrams of powder are deposited.

The relatively high boiling point of some of the liquid slurries for example glycerol requires that the drying be controlled to within close tolerances in order to effectively dry the droplet on the one hand, but prevent oxidation of the tantalum on the other. For glycerine the temperature at the end of the riser is preferably 250°–350°C, most preferably 280°–320°C. A convenient way of drying is to use hot air. A heater, with a source of compressed air (for example a serpentine heater) is effective and can be controlled accurately by controlling the air flow and the power input to the heater.

After drying, the stringers are passed through an inert gas or vacuum furnace for example an argon flushed horizontal sintering furnace. A minimum of vibration and jogging is preferred to prevent the powder from falling off the riser prior to sintering.

The anodes may be either presintered and finally sintered in vacuum, or they may be sintered to completion in a single step. For tantalum or niobium presintering temperatures may range from 1500° to 1800°C. Sintering temperatures for tantalum and niobium may be 1800° to 2200°C A band of elastomeric masking material such as silicone rubber can be applied to the risers (for example by stamping, painting or rolling) to prevent chemicals creeping up the risers during further processing. The stringers are processed according to conventional capacitor manufacturing techniques.

An anodic oxide is formed on the film forming metal members according to known anodization techniques. The resulting anodized anodes may be used with either wet or dry electrolytes which are known in the art. For example, manganese dioxide may be formed on the formed oxide for solid capacitors, or sulfuric, nitric or phosphoric acids may be used for wet electrolyte devices.

Application of contacting coating compositions to the solid electrolyte devices, and incorporated into appropriate containers, and optional encapsulation complete the production of electrolytic capacitors. Without limiting the general application of these anodes, the anodes are particularly adapted to the production of the 1 – 50 ufd volt ratings of the solid type.

What is claimed is:

1. A method of making a capacitor comprising the steps of immersing an end of an elongated wire of film-forming metal in a slurry consisting essentially of a liquid and film-forming metal powder particles suspended in the liquid, withdrawing the end of the elongated wire of film-forming metal from the slurry at a rate to deposit a droplet of liquid and film-forming metal powder over the end of the elongated wire immersed in the slurry, sintering deposited film-forming metal powder to the end of the elongated wire to form a porous deposit of film-forming metal over the end of the elongated wire, forming a dielectric oxide film over the deposited film-forming metal powder, contacting the dielectric oxide film with an electrolyte, and contacting the electrolyte with means to provide a capacitor.

* * * * *